(12) United States Patent
Hsu

(10) Patent No.: US 8,044,935 B2
(45) Date of Patent: Oct. 25, 2011

(54) SCROLL WHEEL DEVICE FOR A COMPUTER MOUSE HAVING A BREAKING MECHANISM

(75) Inventor: Te-Ping Hsu, Taoyuan County (TW)

(73) Assignee: Darfon Electronics Corp., Taoyuan (TW)

( * ) Notice: Subject to any disclaimer, the term of this patent is extended or adjusted under 35 U.S.C. 154(b) by 671 days.

(21) Appl. No.: 12/171,423

(22) Filed: Jul. 11, 2008

(65) Prior Publication Data

US 2009/0033640 A1 Feb. 5, 2009

(30) Foreign Application Priority Data

Aug. 1, 2007 (TW) ................................ 96212629 U

(51) Int. Cl.
*G06F 3/033* (2006.01)
(52) U.S. Cl. ........................................................ 345/163
(58) Field of Classification Search .................. 345/145, 345/170–175, 156–157, 163–167, 184; 178/18.01; 463/37–38
See application file for complete search history.

(56) References Cited

U.S. PATENT DOCUMENTS

| | | | | |
|---|---|---|---|---|
| 5,808,568 A | * | 9/1998 | Wu | 341/20 |
| 5,912,661 A | * | 6/1999 | Siddiqui | 345/166 |
| 6,348,913 B1 | * | 2/2002 | Cho | 345/163 |

* cited by examiner

*Primary Examiner* — Chanh Nguyen
*Assistant Examiner* — Tsegaye Seyoum
(74) *Attorney, Agent, or Firm* — WPAT, PC; Justin King

(57) ABSTRACT

A scroll wheel device for computer mouse is disclosed, which comprises: a scroll wheel, having a scraggly structure formed in the interior thereof; and an adjusting unit. In an exemplary embodiment, the scraggly structure can be a sawtooth-like structure patterned on a circumferential area of a hollowed portion formed inside the scroll wheel; and an adjusting unit is further comprised of an adjusting rod and a braking part, in which the braking part, being made of an elastic material, can be an elastic strip; and the adjusting rod is formed with screw thread. Thereby, by rotating the adjusting rod, the braking part is driven to move along the adjusting rod in response to the rotation of screw thread so that the relative position of the braking part with respect to the scraggly structure is changed accordingly and thus the braking mode of the scroll wheel device is changed. Therefore, simply by rotating the adjusting rod, the braking mode of the scroll wheel device can be adjusted for customizing the scroll wheel device to cope with varying preferences of different users.

3 Claims, 6 Drawing Sheets

SCROLL WHEEL DEVICE FOR A COMPUTER MOUSE HAVING A BREAKING MECHANISM

FIELD OF THE INVENTION

The present invention relates to a scroll wheel device for computer mouse, and more particularly, to a scroll wheel device capable of being customizing to cope with varying preferences of different users.

BACKGROUND OF THE INVENTION

With the rapid advance of technology and the improvement of our quality of life, there are more and more computers being used in all kinds of applications such as transportation system, business related transaction, word processing, computer graphics and video entertainment, etc. Consequently, there can be various demands with respect to the shape of the computer mouse as well as the way the computer mouse is used for controlling the movement of a cursor.

When a user uses a computer mouse configured with a conventional scroll wheel device for web browsing, he/she will usually places his/her index finger on the scroll wheel at a position near the front end of the mouse, and then by the movement of the index finger to bring along the scroll wheel to rotate forward or backward, the web page or frame displayed on the screen can be scroll up or down. However, as the stopper fitted inside the scroll wheel for stopping the wheel is designed with a specific friction, it might require the user to spend quite some effort to rotate the scroll wheel just for reaching the web page containing the information that he/she wants. Such effort might be strenuous for those with less finger strength, such as children, young girls and elders. In addition, it might cause injury to finger in a long-run perspective.

SUMMARY OF THE INVENTION

In view of the disadvantages of prior art, it is the object of the present invention to provide a scroll wheel device capable of being customizing to cope with varying preferences of different users with reference to the use of finger to rotate the scroll wheel of the device.

To achieve the above object, the present invention provides a scroll wheel device for computer mouse, which is able to move its braking part along its adjusting rod in response to the rotation of the screw thread formed on the adjusting rod by rotating the adjusting rod, so that the relative position of the braking part with respect to the scraggly structure formed inside it scroll wheel is changed accordingly and thus the braking mode of the scroll wheel device is changed.

In an exemplary embodiment, the present invention provides a scroll wheel device for computer mouse, comprising:
- a scroll wheel, having a scraggly structure being a sawtooth structure patterned on a circumferential area of a hollowed portion formed inside the scroll wheel; and
- an adjusting unit, further comprising:
    - an adjusting rod, formed with screw thread thereon; and
    - a braking part, being made of an elastic material, and being substantially an elastic strip;
    - wherein, by rotating the adjusting rod, the braking part is driven to move along the adjusting rod in response to the rotation of screw thread so that the relative position of the braking part with respect to the scraggly structure is changed accordingly and thus the braking mode of the scroll wheel device is changed, thereby, simply by rotating the adjusting rod, the braking mode of the scroll wheel device can be adjusted for customizing the scroll wheel device to cope with varying preferences of different users with reference to the use of finger to rotate the scroll wheel of the device.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
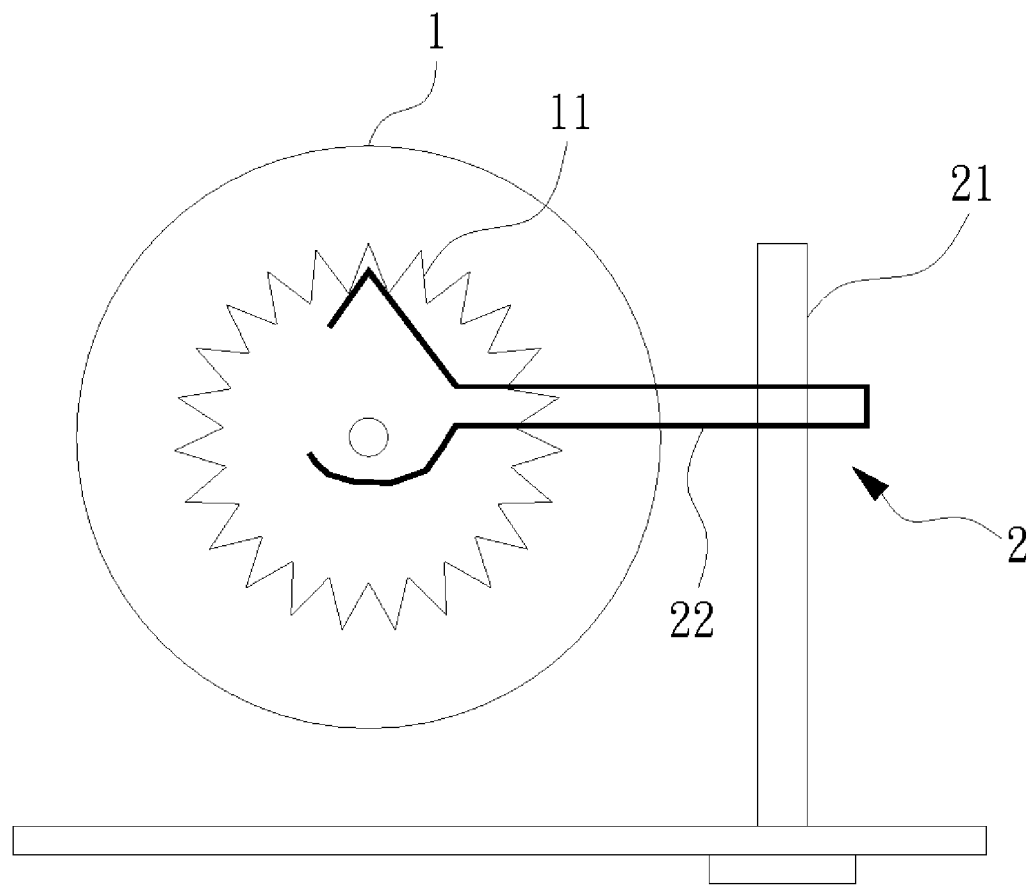
FIG. 1 is a sectional view showing that a tapered top of a braking part configured in a scroll wheel device is inset in a sawtooth-like concave of its scraggly structure according to an exemplary embodiment of the invention.

Please refer to FIG. 1, which is a sectional view showing that a tapered top of a braking part configured in a scroll wheel device is inset in a sawtooth-like concave of its scraggly structure according to an exemplary embodiment of the invention. In FIG. 1, the scroll wheel device comprises a scroll wheel 1 and an adjusting unit 2, in which the adjusting unit 2 further comprises an adjusting rod 21 and a braking part 22; and the scroll wheel 1 is formed with an hollowed portion therein which is further being configured with a scraggly structure 11 of its circumferential area. In this embodiment, the scraggly structure 11 is a sawtooth-like structure, but is not limited thereby. As shown in FIG. 1, the braking part 22, being made of an elastic material, is mounted on the adjusting rod 21 as the adjusting rod 21 is arranged at a side of the scroll wheel 1, by that an end of the braking part 22 is connected to the adjusting rod 21 while enabling another end thereof to be extended into the hollowed portion of the scroll wheel 1. When the tapered top of the braking part 22 is inset in a sawtooth-like concave of the scraggly structure 11, the rotation of the scroll wheel 1 by the poking of a user's finger will be forced to stop by the resistance between the scraggly structure 11 and the braking part 22 so that the cursor controlled by the scroll wheel device can only either move a short distance or move in a stepwise manner.

Figure 2:
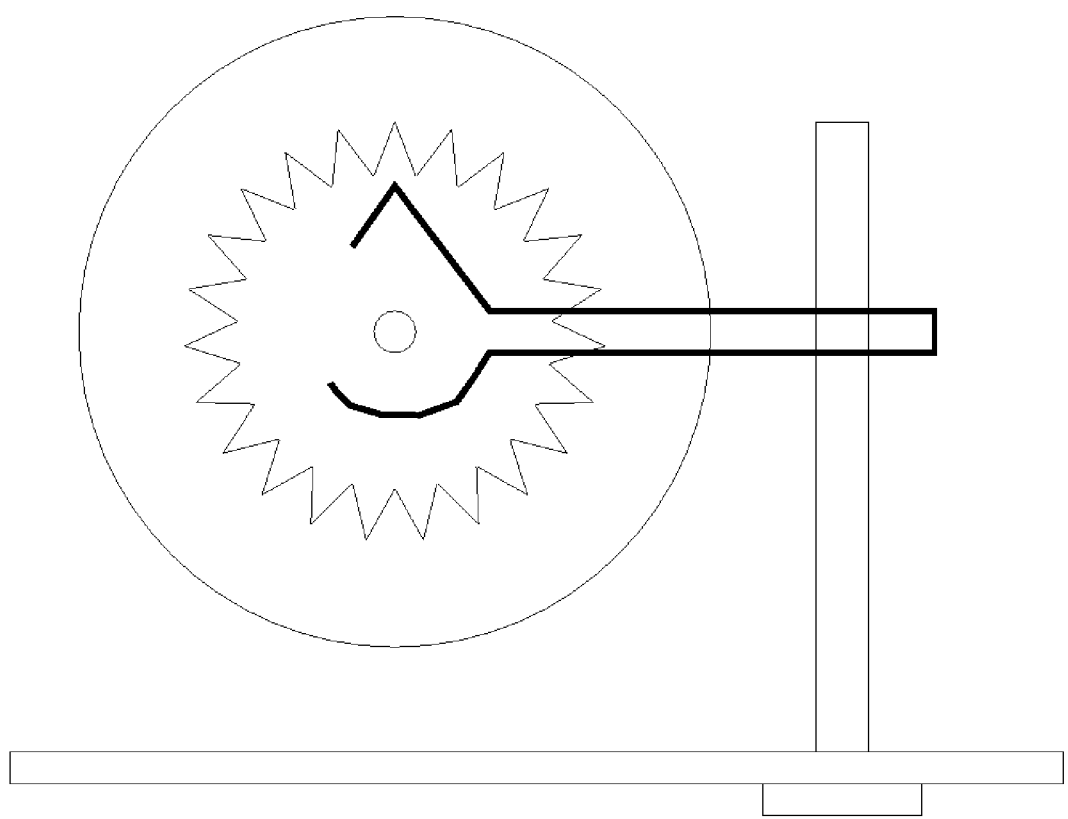
FIG. 2 is a schematic view showing that a tapered top of a braking part configured in a scroll wheel device is departed from insetting into a sawtooth-like concave of its scraggly structure according to an exemplary embodiment of the invention.

Please refer to FIG. 2, which is a schematic view showing that a tapered top of a braking part configured in a scroll wheel device is departed from insetting into a sawtooth-like concave of its scraggly structure according to an exemplary embodiment of the invention. In FIG. 2, the braking part 22 is departed from contacting with the scraggly structure 11, by which when the scroll wheel 1 is being rotate by the poking of user's finger, the rotation of the scroll wheel 1 is not affected by the braking part 22 and thus can keep on rotating for a comparatively longer time so that the cursor controlled by the scroll wheel device can be moved for a comparatively loner distance for adapting the mouse for a situation that there are plenty of pages to be browsed.

Figure 3:
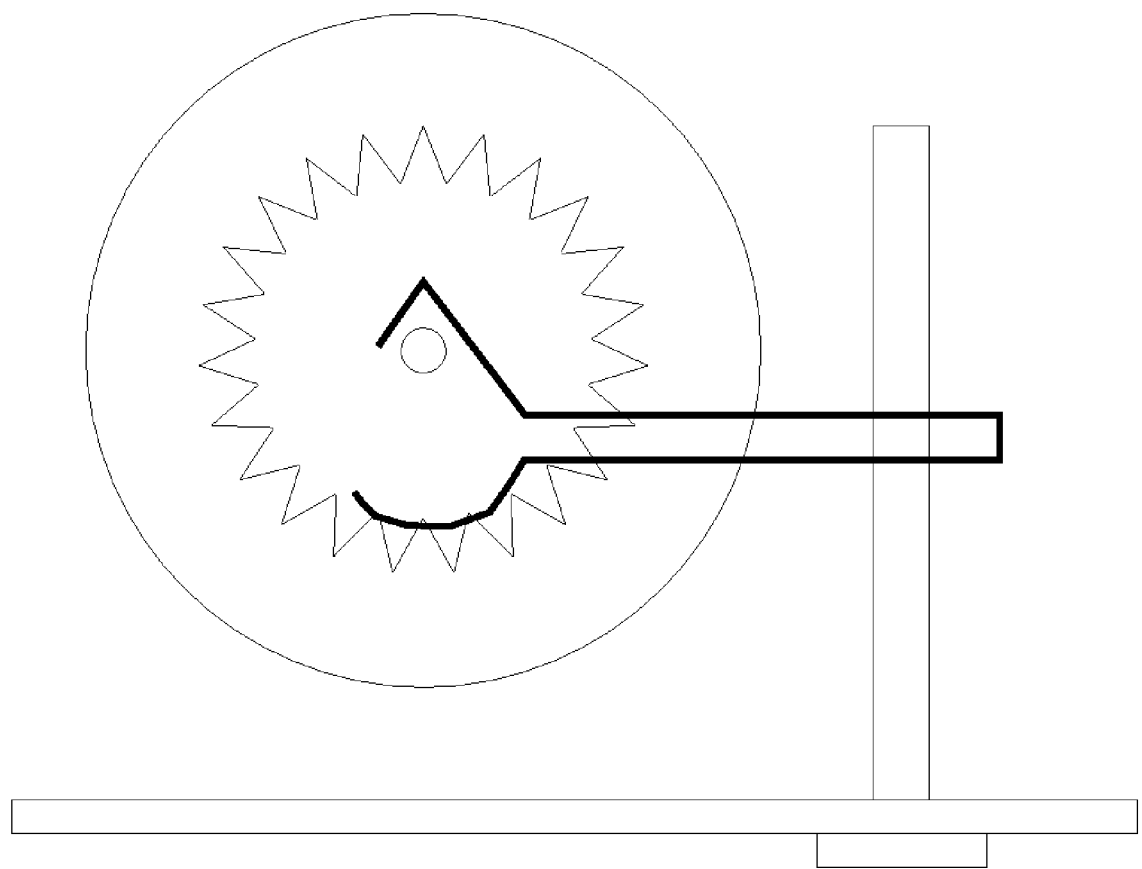
FIG. 3 is a sectional view showing that a bottom of a braking part configured in a scroll wheel device is abutted against its sawtooth-like scraggly structure according to an exemplary embodiment of the invention.

Please refer to FIG. 3, which is a sectional view showing that a bottom of a braking part configured in a scroll wheel device is abutted against its sawtooth-like scraggly structure according to an exemplary embodiment of the invention. As shown in FIG. 3, the bottom of the braking part 22 is abutted against its sawtooth-like scraggly structure 11, by which when the scroll wheel 1 is being rotate by the poking of user's finger, the rotation of the scroll wheel 1 is affected by the friction between the arc-shaped bottom of the braking part 22 and the scraggly structure 11 so as to stop the scroll wheel 1 gradually.

Figure 4:
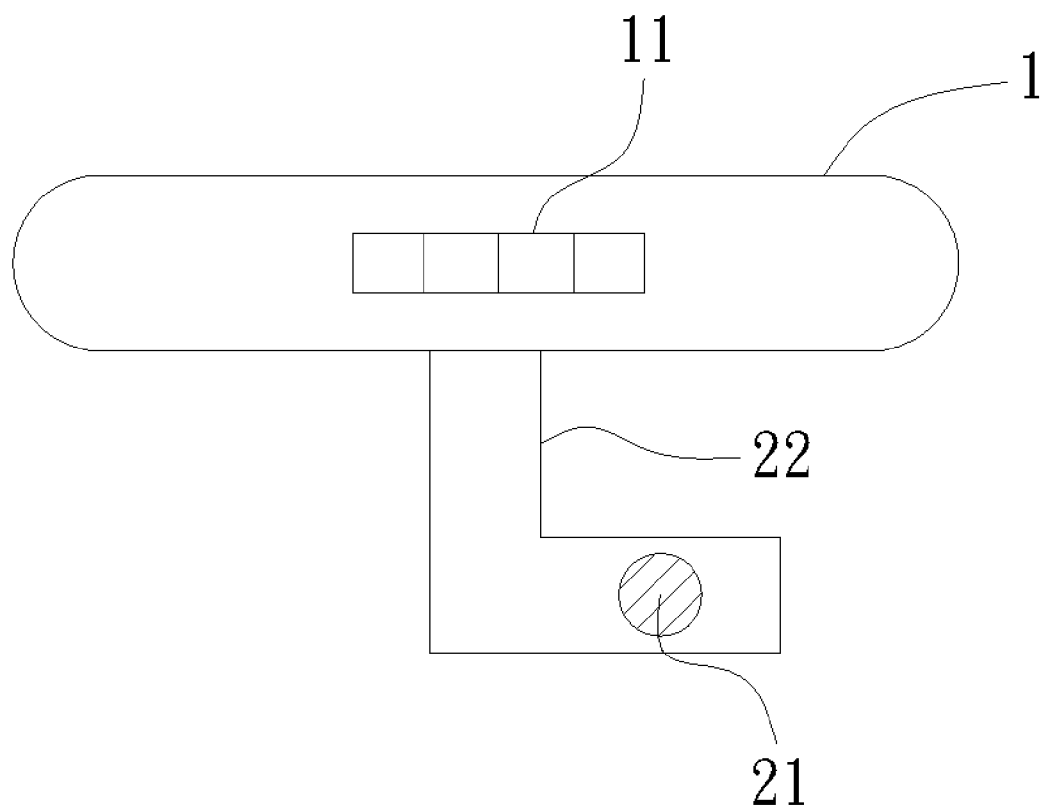
FIG. 4 is a top view of a scroll wheel device for computer mouse according to an exemplary embodiment of the invention.
Figure 5:
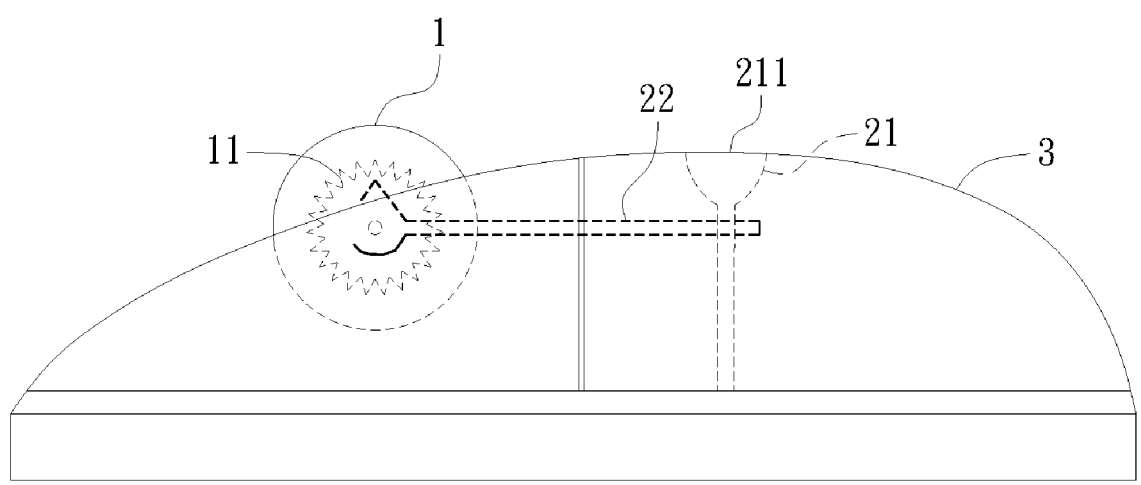
FIG. 5 is a side view of a scroll wheel device for computer mouse according to a first embodiment of the invention.
Figure 6:
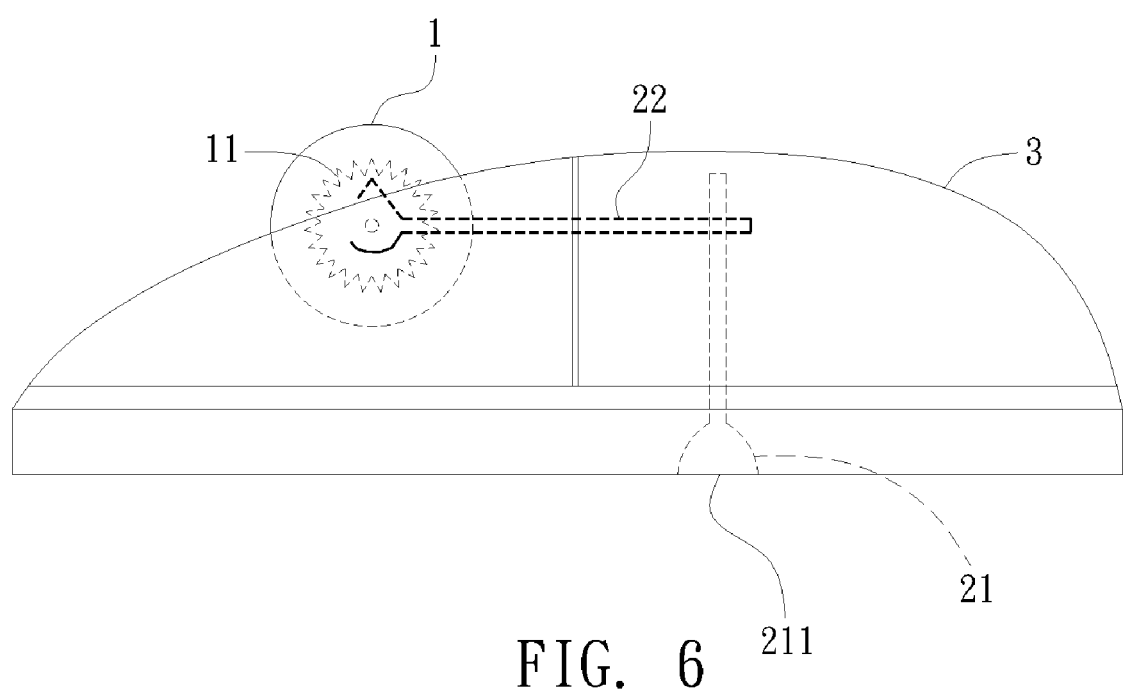
FIG. 6 is a side view of a scroll wheel device for computer mouse according to a second embodiment of the invention.

Please refer to FIG. 4, FIG. 5 and, which respectively are a top view of a scroll wheel device and two side views of scroll wheel devices according to a first and a second embodiments of the invention. From the embodiment shown in FIG. 5 and FIG. 6, the operation interface 211 formed on the adjusting rod 21 which is provided for rotating the adjusting rod 21 and thus bringing the braking part 22 to move inside the scroll wheel 1, can be either being arranged on the top of a computer mouse 3 or at the bottom of the mouse 3.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A scroll wheel device for a computer mouse, comprising:
   a scroll wheel, having a scraggly structure formed therein, being a sawtooth-like structure formed on a circumferential area of a hollowed portion formed inside the scroll wheel; and
   an adjusting unit, comprising:
   an adjusting rod formed with a screw thread thereon; and
   a braking part, capable of being moved by the rotation of the adjusting rod and thus changing its relative position with respect to the scraggly structure, wherein the braking part abutted against the scraggly structure so as to stop the scrolling wheel.

2. The scroll wheel device of claim 1, wherein the braking part is made of an elastic material.

3. The scroll wheel device of claim 1, wherein the braking part is an elastic strip.

* * * * *